United States Patent
Bellina et al.

[11] Patent Number: 6,121,758
[45] Date of Patent: *Sep. 19, 2000

[54] ADAPTIVE SYNCHRONOUS CAPACITOR SWITCH CONTROLLER

[75] Inventors: Gerald Bellina, Califon; Philip Epstein, Warren, both of N.J.

[73] Assignee: DAQ Electronics, Inc., Piscataway, N.J.

[*] Notice: This patent issued on a continued prosecution application filed under 37 CFR 1.53(d), and is subject to the twenty year patent term provisions of 35 U.S.C. 154(a)(2).

[21] Appl. No.: 09/338,155

[22] Filed: Jun. 23, 1999

[51] Int. Cl.[7] ........................................................ G05F 1/70
[52] U.S. Cl. ............................................. 323/211; 323/210
[58] Field of Search .................................. 323/205, 207, 323/209, 210, 211

[56] References Cited

U.S. PATENT DOCUMENTS

| | | | |
|---|---|---|---|
| Re. 33,184 | 3/1990 | Westfall et al. ........................... | 323/243 |
| 3,904,952 | 9/1975 | Evalds ........................................ | 323/24 |
| 3,914,625 | 10/1975 | Billings et al. ........................... | 387/992 |
| 3,987,360 | 10/1976 | Brennen et al. ......................... | 323/101 |
| 4,055,795 | 10/1977 | Mathieu ..................................... | 323/318 |
| 4,068,159 | 1/1978 | Gyugyi ..................................... | 323/119 |
| 4,174,497 | 11/1979 | Depenbrock ........................... | 323/119 |
| 4,204,150 | 5/1980 | Mathieu ..................................... | 323/102 |
| 4,348,631 | 9/1982 | Guygyi et al. ............................ | 323/211 |
| 4,356,440 | 10/1982 | Curtiss et al. ............................ | 323/210 |
| 4,359,678 | 11/1982 | Raivola et al. ........................... | 323/211 |
| 4,365,190 | 12/1982 | Pasternack et al. ..................... | 323/211 |
| 4,398,141 | 8/1983 | Brennen et al. ......................... | 323/211 |
| 4,571,535 | 2/1986 | Gyugyi ..................................... | 323/211 |
| 4,602,206 | 7/1986 | Walker ....................................... | 323/211 |
| 4,645,997 | 2/1987 | Whited ....................................... | 323/211 |
| 4,698,581 | 10/1987 | Shimamura et al. ..................... | 323/211 |
| 4,769,587 | 9/1988 | Pettigrew ................................. | 323/209 |
| 4,791,545 | 12/1988 | Hinckley ................................... | 363/81 |
| 4,876,497 | 10/1989 | Colvert ..................................... | 323/211 |
| 4,885,675 | 12/1989 | Henze et al. ............................. | 363/26 |
| 4,891,569 | 1/1990 | Light ......................................... | 323/210 |
| 4,916,377 | 4/1990 | Terada et al. ............................ | 323/210 |
| 4,982,148 | 1/1991 | Engelmann .............................. | 323/207 |
| 5,053,691 | 10/1991 | Wild et al. ................................ | 323/211 |
| 5,124,628 | 6/1992 | Ogiwara ................................... | 323/211 |
| 5,134,355 | 7/1992 | Hastings ................................... | 323/211 |
| 5,134,356 | 7/1992 | El-Sharkawi et al. ................... | 323/211 |
| 5,180,963 | 1/1993 | El-Sharkawi et al. ................... | 323/211 |
| 5,374,853 | 12/1994 | Larsen et al. ............................ | 307/102 |
| 5,402,057 | 3/1995 | D'Aquila et al. ......................... | 323/211 |
| 5,402,058 | 3/1995 | Larsen ..................................... | 323/211 |

(List continued on next page.)

FOREIGN PATENT DOCUMENTS 60-254306  12/1985  Japan ...................................... 323/211

*Primary Examiner*—Matthew Nguyen
*Attorney, Agent, or Firm*—Lerner, David, Littenberg, Krumholz & Mentlik, LLP

[57] ABSTRACT

A method and apparatus are provided directed to a synchronous and adaptive capacitor switch controller for minimizing transients in the power factor correction of an electric power distribution system or transmission line. In particular, a capacitor, operatively associated with an electrical bus for distributing electric power, is provided for varying a capacitance on the electrical bus to perform power factor correction. A mechanical switch having a variable switch delay is provided for electrically connecting and disconnecting the capacitor to the electrical bus. A disturbance detector for measuring a voltage disturbance on the electrical bus upon connection and disconnection of the capacitor is further included. Finally, a switch controller is included to determine the variable switch delay of the mechanical switch as defined by the time delay between a switch trigger and said connecting and disconnecting of said capacitor to said electrical bus wherein the controller causes the connection of the capacitor to the electric bus by issuing the switch trigger at such a time so as to minimize the detected voltage disturbance.

32 Claims, 4 Drawing Sheets

U.S. PATENT DOCUMENTS

| | | | |
|---|---|---|---|
| 5,465,040 | 11/1995 | Yasotornrat | 323/210 |
| 5,469,045 | 11/1995 | Dove et al. | 323/211 |
| 5,532,575 | 7/1996 | Ainsworth et al. | 323/211 |
| 5,534,766 | 7/1996 | Bonissone et al. | 323/235 |
| 5,541,498 | 7/1996 | Beckwith | 323/211 |
| 5,568,042 | 10/1996 | Nyberg et al. | 323/211 |
| 5,617,447 | 4/1997 | Tambe | 373/108 |
| 5,644,214 | 7/1997 | Lee | 232/211 |
| 5,652,504 | 7/1997 | Bangerter | 323/239 |
| 5,654,625 | 8/1997 | Konstanzer et al. | 323/211 |
| 5,670,864 | 9/1997 | Marx et al. | 323/211 |
| 5,672,957 | 9/1997 | Bergmann | 323/210 |
| 5,719,757 | 2/1998 | Beyerlein | 363/34 |
| 5,729,120 | 3/1998 | Stich et al. | 232/237 |
| 5,736,838 | 4/1998 | Dove et al. | 323/211 |
| 5,757,168 | 5/1998 | DeVale | 323/235 |

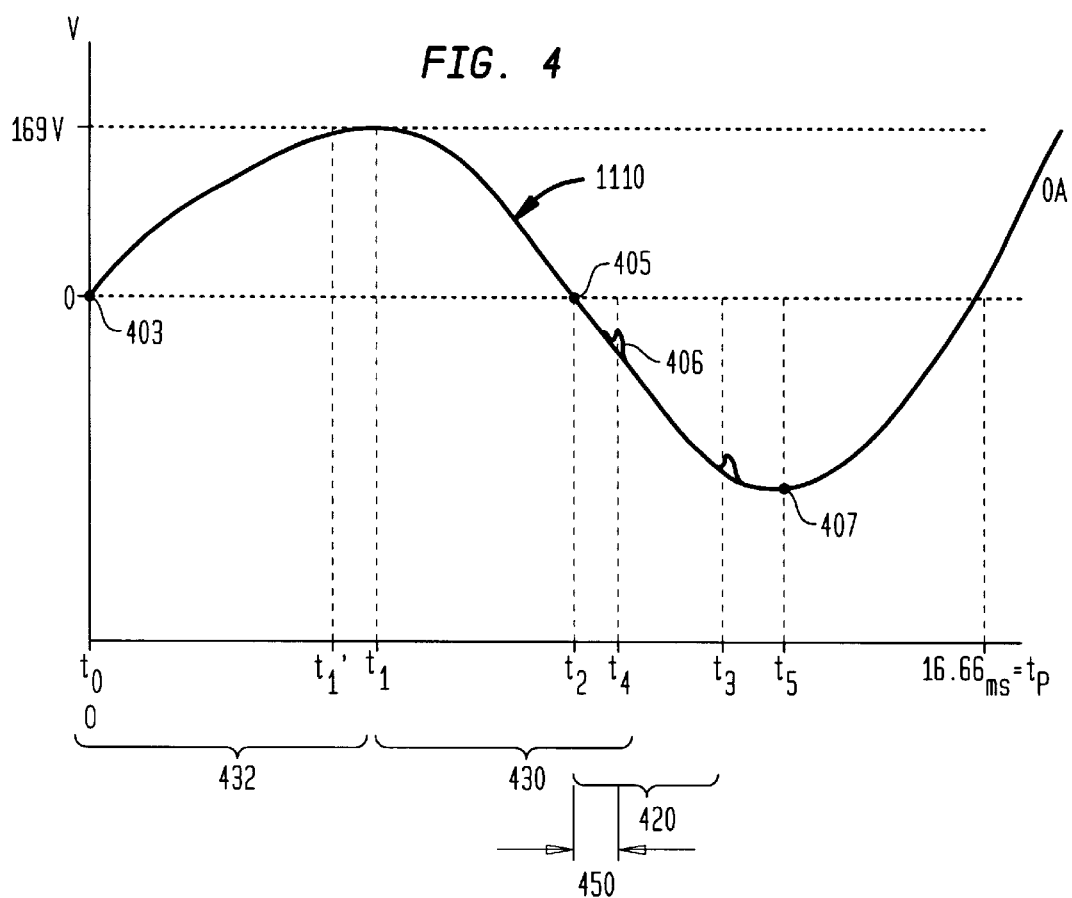

ADAPTIVE SYNCHRONOUS CAPACITOR SWITCH CONTROLLER

FIELD OF THE INVENTION

The present invention relates to electric power controllers, and in particular, to a synchronous controller for sensing a voltage-based, zero-crossing switch time and controlling slow mechanical switches based upon the sensing.

BACKGROUND OF THE INVENTION

Capacitors have been used by electric power utilities for many years to correct and adjust the power factor in alternating current power distribution systems. When highly inductive loads, typically large motors used in industrial plants, are connected to power lines, a shift in the phase angle between the supplied voltage and current results. Because the total instantaneous power in a three phase electric power system is related to the cosine of the phase angle between the line voltage and line current, the difference in the phase angle between the line voltage and line current may be expressed as a value called a power factor in which a power factor of 1.0 VARS (volt-ampere reactive) represents a 0 degree phase shift and a power factor of 0.0 VARS represents a 90 degree phase shift. A + or − sign is often used to indicate whether the current leads or lags the voltage respectively.

This phase shift creates two problems for the power company. First, a large amount of reactive power is used in distributing electrical energy on a power line having a small power factor. The power company must supply this power which represents a nonproductive loss of power in the distribution of the electrical energy. As a result, power companies often require consumers of electric power to provide for a minimum power factor at their point in the power distribution network as a part of their power consumption responsibilities. Second, a small power factor and the above-mentioned associated line losses result in a drop in the line voltage at the customer site. This is problematic to the customer equipment that relies on a reliable and steady line voltage.

To solve these problems, a well-known practice of introducing capacitor banks on the power lines near the load has been employed. One solution is to permanently connect a fixed amount of capacitance to the line. A better solution is to provide several banks of capacitors that are switched in and out, depending on the power factor, or line voltage. The decision to switch the capacitors in or out can vary between simple algorithms, which take into account the time of day, temperature or voltage (often used where air-conditioning loads are the main problem), to extremely complex algorithms, which combine the actual phase shift, temperature, voltage, time of day, available capacitors, and the actual load, in addition to other power distribution variables. In either case, the net effect of introducing this capacitance is to reduce or eliminate the reactive power and/or voltage losses caused by the inductive motor loads and to return the power factor closer to unity.

Power factor correction at the electric power generating facilities themselves is known. As illustrated in U.S. Pat. No. 4,645,997, large solid state switches are often used with complicated algorithms to introduce the corrective capacitance onto the line at appropriate times to avoid voltage transients. In particular, unless the corrective capacitors are switched in at the voltage zero-crossings or out at the current zero-crossings, a voltage surge or transient is produce that disrupts the normal line voltage. Over the past several years, factories have increasingly installed very expensive, complex motor control systems that increase efficiencies and allow better speed control. Further, a significant increase in the industrial use of computer systems and other sensitive equipment has taken place in the last few years. Both of these systems rely heavily on the control of the supplied electric power during sub-cycle times and are easily disrupted by voltage surges or transients caused by switching capacitors in or out in the middle of the cycle, i.e. not at the appropriate zero-crossings.

Expensive solid state switches, used at power generation facilities to connect the corrective capacitors, have fast switching times as compared to the 60 Hz. power cycle period of 16.66 milliseconds. These fast switches simplify the calculations involved in properly introducing corrective capacitors onto the power line at appropriate times. That is, the switch delays are often not a parameter to include in the calculation of zero-crossing switch times. In this regard, the switch should be closed within about 2 microseconds of the zero-crossing when connecting the capacitor to the line to minimize line voltage disturbances.

However, the electric power distribution system also includes thousands of corrective capacitor banks at various pole-mounted locations along the power distribution network. These power distribution points typically handle 15–20 kilovolts (KV) power lines. Traditionally, the power companies have remotely administered the connection of these capacitors through the use of programmable circuit boards atop the poles. Unlike the capacitor banks with solid state switches in the power generation facilities, however, less expensive, solenoid driven switches are used to connect these remotely located corrective capacitors to the power lines. Unlike their solid state counterparts, these solenoid driven switches have large switch times compared to the power cycle period, often on the order of 10 milliseconds or more. As such, the switching of these solenoid driven switches has heretofore taken place without any consideration of the line voltage at the instant of closure. In addition to the large switch time that must be taken into account, these solenoid driven switches are also prone to mechanical degradation over time. This degradation alters the switching time of the device and increases the timing of when to switch the capacitors in and out. Further, the closing and opening times of the switches may be different from one another and must therefore be accounted for appropriately in the calculation of the switch's opening and closing.

Thus, the need exists for a synchronous capacitor switch controller that provides disturbance feedback to accurately and reliably determine and control an appropriate switching time for a solenoid driven or mechanical switch having a long switching time relative to the power line power cycle period. Further, the need exists for a switch controller that accounts for a switching time that changes over time. Also needed is a switch controller that uses only a voltage monitoring of line disturbances to determine is switching times thereby obviating the need for expensive current transformers to detect capacitor currents.

SUMMARY OF THE INVENTION

In a preferred embodiment of the present invention a system for minimizing transients in an electric power distribution system is provided comprising an electrical bus for distributing electric power, the electrical bus including at least a single phase ac voltage; a capacitor operatively associated with the electrical bus for varying a capacitance on the electrical bus to perform power factor correction; a mechanical switch for electrically connecting and disconnecting the capacitor to the electrical bus, the mechanical switch including a variable switch delay defined by a time delay between a switch trigger and the connecting and disconnecting of the capacitor to the electrical bus; a disturbance detector for measuring a voltage disturbance on the single phase ac voltage of the electrical bus when the capacitor is connected to and disconnected from the phase by the mechanical switch, and a switch controller for determining the variable switch delay based on the voltage disturbance whereby the controller issues the switch trigger at such a time to minimize the voltage disturbance when the mechanical switch electrically connects and disconnects the capacitor to the electrical bus.

In another aspect of the invention, the single phase ac voltage has zero crossings, and the system further comprises a zero crossing detector for detecting the zero crossings, the switch controller further determines a connection anticipation time measured from the zero crossings, the sum of the connection anticipation time and the variable switch delay equaling a time between zero crossings, the switch controller minimizes the voltage disturbance by issuing the switch trigger at the connection anticipation time whereby the mechanical switch electrically connects the capacitor to the electrical bus at the zero crossings. Additionally, the system for minimizing transients may further comprise a capacitor discharger for discharging the capacitor to zero volts prior to connection to the electrical bus.

In yet another aspect of the invention, the single phase ac voltage has zero crossings, and the system further comprises a zero crossing detector for detecting the zero crossings, the switch controller further determines a disconnection anticipation time measured from the zero crossings, the sum of the disconnection anticipation time and the variable switch delay equaling a time between zero crossings plus a half of the time between two consecutive zero crossings, the switch controller minimizes the voltage disturbance by issuing the switch trigger at the disconnection anticipation time whereby the mechanical switch electrically disconnects the capacitor from the electrical bus at a point half way between the zero crossings.

In yet other embodiments of the invention, the electrical bus includes a three-phase ac voltage and the system further comprises a plurality of capacitors, at least one of the plurality of capacitors operatively associated to the electrical bus for varying a capacitance of each of the phases of the electrical bus. Further, the time delay between the switch trigger and the connecting of the capacitor to the electrical bus may be different from the time delay between the switch trigger and the disconnecting of the capacitor from the electrical bus. Also, the system may further comprise a memory for storing the variable switch delay, the controller modifying the stored variable switch delay based on the voltage disturbance when the capacitor is connected to and disconnected from the electrical bus.

According to another embodiment, the system further comprises a comparator for comparing the voltage disturbance to a voltage disturbance threshold and the controller modifies the stored variable switch delay when the comparator determines that the voltage disturbance exceeds the voltage disturbance threshold. Additionally, the system may further comprise a tolerance representing a maximum modification to the stored variable switch delay.

Other aspects of the invention include the controller further determining a wait time representative of a circuit delay from the voltage disturbance and issuing the switch trigger based on both the variable switch delay and the wait time so as to minimize the voltage disturbance. Also, the disturbance detector may be a high-pass filter. Further, the system switch controller may be a microprocessor.

In yet other aspects of the invention, the system includes a noise filter for filtering noise on the electrical bus. Also, the system may further comprise a remote terminal unit operatively coupled to the controller for making global decisions regarding the connections and disconnections of the capacitor to and from the electrical bus. Still further, the system further comprises a manual override for overriding the issue of the switch trigger by the controller. Additionally, the system's mechanical switch may be a vacuum-sealed switch having a solenoid for operating the switch. In other embodiments, the system further comprises a triac for firing an energizing capacitor into the solenoid according to a controller command, the firing of the triac comprising the switch trigger and the system further comprises a delay module for enforcing a delay between subsequent firings of the triac.

In a preferred method of the present invention, steps for minimizing transients in the power factor correction of an electric power distribution system, include: determining a variable switch delay for a mechanical switch, the variable switch delay defined by a time delay between a switch trigger and a connecting or disconnecting of a capacitor to an electrical bus, the electrical bus having at least a single phase ac voltage; determining a connection or disconnection time for the capacitor to the electrical bus; triggering the mechanical switch at the variable switch delay prior to the determined connection or disconnection time; measuring a voltage disturbance on the electrical bus resulting from the capacitor connection or disconnection to the electrical bus, and adjusting the triggering of the switch based on the voltage disturbance.

In other embodiments of the present inventive method, the step of determining the connection or disconnection time includes detecting zero crossings of the ac voltage, and determining a connection anticipation time measured from the zero crossing, the sum of the connection anticipation time and the variable switch delay equaling a time between the zero crossings, and the step of triggering being performed such that the capacitor is connected to the electrical bus at the zero crossings. Also, the inventive method may include the steps of detecting zero crossings of the ac voltage, and determining a disconnection anticipation time measured from the zero crossing, the sum of the disconnection anticipation time and the variable switch delay equaling a time between the zero crossings plus a half of the time between two consecutive zero crossings, and the step of triggering being performed such that the capacitor is disconnected from the electrical bus at a point half way between the zero crossings.

In yet another embodiments of the present inventive method, steps for storing the variable switch delay time in a memory, wherein step of storing includes the steps of storing both a connection time and a disconnection time, are included. The method may further include comparing the voltage disturbance to a voltage disturbance threshold and performing the step of adjusting the triggering when the voltage disturbance threshold is exceeded. Additionally, the method further comprises determining a wait time based on circuit delays, the step of adjusting being based on the wait time. In other variations, the method further comprises filtering noise from the electrical bus and the step of measuring includes high-pass filtering.

In another embodiment of the present invention, a system for minimizing transients in an electric power transmission line is presented comprising: a mechanical switch for electrically connecting and disconnecting an electrical component to the transmission line, the mechanical switch including a variable switch delay defined by a time delay between a switch trigger and the connecting and disconnecting of the electrical component to the transmission line; a disturbance detector for measuring a voltage disturbance on the transmission line when the electrical component is connected to and disconnected from the transmission line by the mechanical switch, and a switch controller for determining the variable switch delay based on the voltage disturbance whereby the controller issues the switch trigger at such a time to minimize the voltage disturbance when the mechanical switch electrically connects and disconnects the electrical component to the transmission line. The electrical component of this system may be a capacitor used to correct the power factor.

BRIEF DESCRIPTION OF THE DRAWINGS

The present invention may be more fully understood by one of skill in the art with reference being had to the following detailed description of several preferred embodiments, taken in conjunction with the accompanying drawings wherein like elements are designated by identical reference numbers throughout several views and in which:

FIG. 4. is a timing diagram, illustrating the system's operational timing according to a preferred embodiment of the invention.

DETAILED DESCRIPTION OF A PREFERRED EMBODIMENT

Figure 1:
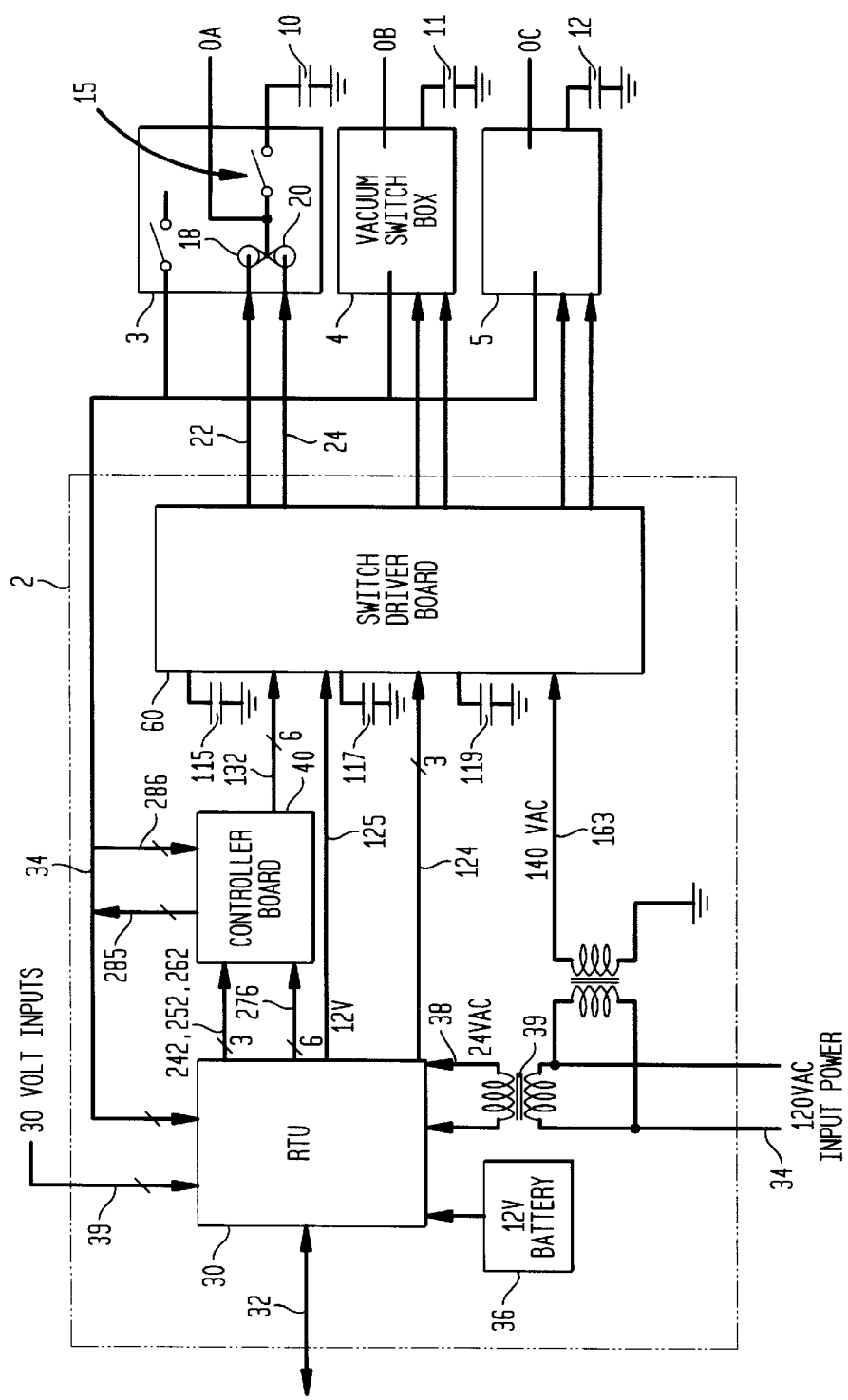
FIG. 1. is a system block diagram of a power factor correction system according to a preferred embodiment of the present invention.

FIG. 1 shows a block diagram of the overall adaptive synchronous capacitor switch controller system for power factor correction. In particular, cabinet 2 is provided to house the digital circuit components of the present invention. Cabinet 2 is typically mounted near the top of standard electric power distribution poles and contains components that are used to control and monitor the 15–20 KV power line found at intermediary or industrial end points in the power distribution network. Three power factor correction capacitors 10, 11 and 12 are provided, one each for connection to each of the three phases of the power line (labeled ΦA, ΦB and ΦC throughout). These power factor correction capacitors provide for the above-mentioned power factor correction on the power line and are typically of oil-filled construction and have a variety of operating values, although 300 kVA is typical. Large, vacuum-sealed, switch boxes 3, 4 and 5 are electrically connected to cabinet 2 for the purpose of controlling the opening and closure of the switches, thereby connecting the oil-filled capacitors to the three phases of the power distribution line ΦA, ΦB and ΦC.

Switch boxes 3, 4 and 5 contain vacuum-sealed 15 KV switches used to connect the associated power factor correction capacitors, 10 11 and 12 to the appropriate phase of the power line. Switch boxes 3, 4 and 5 may contain any of the large mechanical switches used for this purpose but typically contain solenoid driven switches, as manufactured by Joslyn for example. In this regard, switch box 3 includes a switch 15 for connecting the associated power factor correction capacitor 10 to phase A (ΦA) of the power line. Switch 15 is actuated by two different solenoids 18 and 20, one each for respectively opening and closing the switch. For example, switch 15 is opened upon energization of solenoid 18 via control line 22 thereby disconnecting oil-filled capacitor 10 from phase A of the power line. Likewise, switch 15 is closed when solenoid 20 is energized by control signal 24 thereby connecting power factor correction capacitor 10 to phase A of the power line.

Solenoids 18 and 20 are very large in size given the size of the switch 15 that must be controlled by them. As such, the operating currents required to energize the solenoids to open closed switch 15 are large, and significant delay times are associated with the opening and closing of the switch as timed from the presentation of a triggering signal on control signals 22 and 24. In particular, a delay of 10 milliseconds or more may exist after presenting a triggering signal on control signal 22 before solenoids 18 and 20 are energized enough to open or close switch 15. This delay constitutes a significant portion of the 16.66 millisecond voltage cycle period on the 60 Hz power line. Consequently, it is difficult to determine and coordinate the exact timing of the closure and opening of the switch with respect to the zero voltage crossings on the power lines.

Cabinet 2 shown in FIG. I contains numerous circuit boards, including a remote terminal unit (RTU) 30, a controller board 40, and a switch driver board 60. RTU 30 is connected to a remote central office through command interface 32. Status monitoring and switch open and closure commands from the central office are transmitted to cabinet 2 over command interface 32 to remotely monitor and administrate the cabinet functions. Status bus 34 includes status signals provided from switch boxes 3, 4 and 5 to the RTU to indicate the open/closed positions of the switches. Status information from the controller board 40 is similarly provided to the RTU on status bus 34 for remote monitoring and administration. Step-down potential transformer 39 takes one phase of the 120 volt power line and provides RTU 30 with a 24 volt isolated power supply 38. A twelve volt battery 36 provides backup power to the RTU 30 in the event that power is lost on the attached power line. Three-phase voltage inputs 39 are also provided to the RTU 30 for monitoring the power line voltages. In turn, bus signals 242, 252, and 262 are connected to RTU 30 and controller board 40 for providing these three phase voltage levels to the controller board 40. Finally, command bus 276 is connected to both the RTU 30 and the controller board 40 for passing commands from the RTU 30 to the controller board 40.

RTU 30 is generally used to control the connection of power factor correction capacitors 10, 11 and 12 to the power line at various times of the day or during seasonal or peak usage times. As such, a processor and memory (not shown) are provided within the RTU and are addressable over command interface 32 from the central office such that the RTU may be programmed to effectuate the connection of the power factor correction capacitors at any given time. These global, usage-based connection commands are intended to allow the central office to manually connect the power factor correction capacitors to the power line or to provide for the automation of the same function. A long time delay, on the order of seconds, between the issuance of the commands from the central office and the actual opening or closing of the switches is experienced using this method of administration due to the associated transmission delays, RTU circuit delays and solenoid-based switch delays. The RTU may be programmed to cause an automatic connection of the capacitors at various times of the day, or during specific dates of the year, to minimize these delays, although the internal RTU delays and solenoid open/closure delays are still present between the command issuance and the termination of the actual switch operation.

Figure 2:
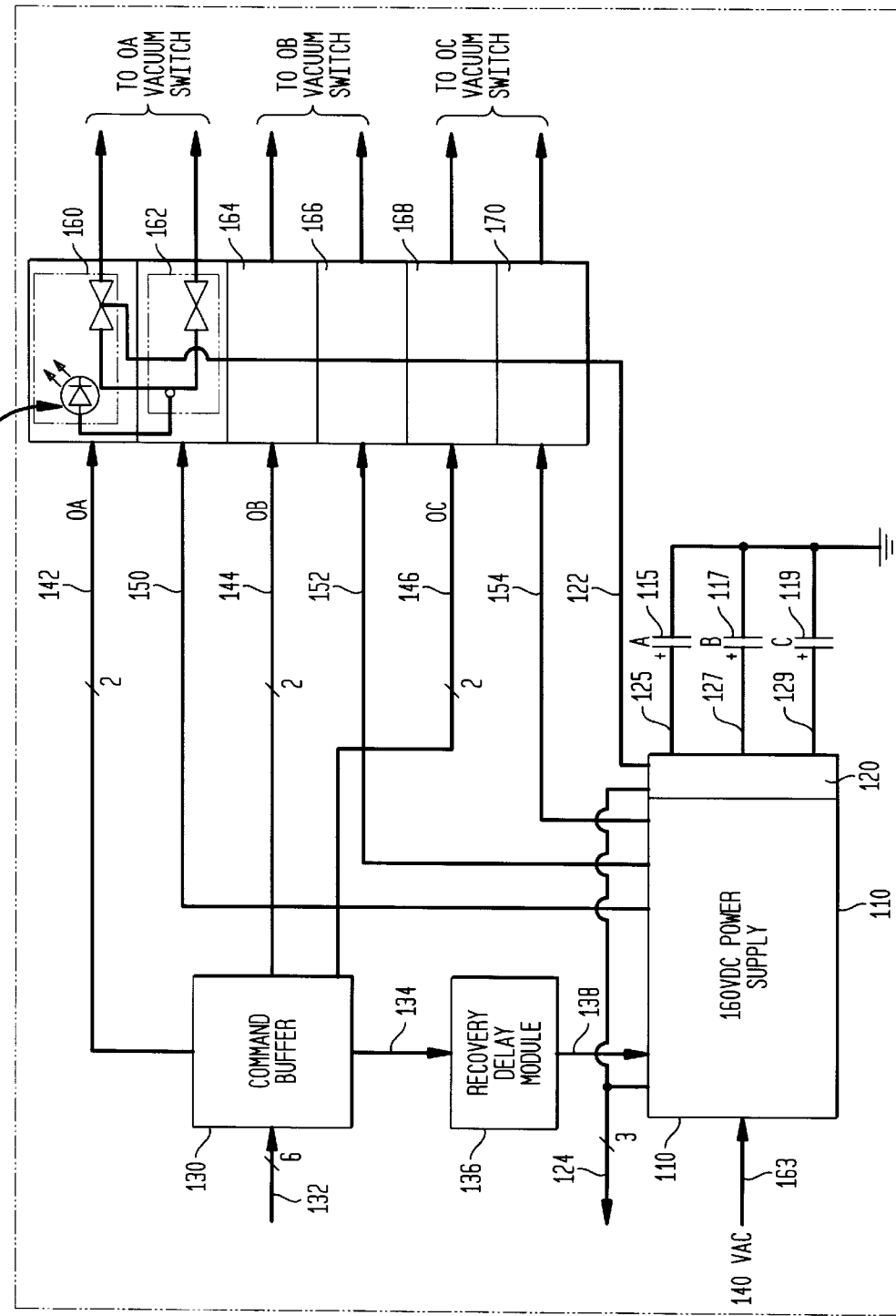
FIG. 2 is a block diagram of one component circuit of the system shown in FIG. 1.

FIG. 2 illustrates the block level details of switch driver board 60 contained within cabinet 2. Switch drive board 60 controls the energization of the solenoids within vacuum-sealed switch boxes 3, 4 and 5 thereby controlling the opening and closing of the switches therein. In addition, switch driver board 60 is electrically connected to firing capacitors 115, 117 and 119, which are typically mounted external to the switch driver board but within cabinet 2. Firing capacitors 115, 116 and 117 provide the significant driving current source necessary for the energization of the solenoids within the switch boxes.

Twelve volt power supply bus 125 supplies switch driver board with its operating power as shown in FIG. 1. A DC power supply 110 is located on switch driver board 60 and converts the 140 V AC power bus 163 from step-up transformer 37 of FIG. 1 into 160 V DC regulated output. Charging circuit 120 then takes this regulated 160 V DC output and provides charging output to firing capacitors 115, 117, and 119 at signals 125, 127 and 129 respectively. During switching operations, the solenoids within the switch boxes draw up to 40 amps of current to fire the switch and these firing capacitors are used as a primary current source for this purpose. In addition to providing charging current for the firing capacitors, DC power supply 110 is desirable in that it eliminates the need for additional timing and voltage sensing circuitry which would be necessary to monitor and control the flow of AC current to the switch solenoids during switching operations.

According to a preferred embodiment of the present invention, DC power supply 110 may be implemented using pulse-with-modulation circuitry which switches a triac connected to DC power supply 110 on and off so as to maintain 160V on large external firing capacitors 115, 117 and 119. Capacitors 115, 117 and 119 are typically large electrolytic capacitors of 4700 microfarads. These capacitors are charged during the quiescent, i.e., non-switching, state of the switch driver board. Other discreet digital circuitry, including charging diodes and timing networks, may be included as part of charging circuit 120. When firing capacitors 115, 117 and 119 are fully charged, charging circuitry 120 outputs an enable single 122 which permits high-power, photo-isolated triac switches 160, 162, 164, 166, 168, and 170 to operate. Further, charging circuit 120 also provides high-voltage monitor outputs for each of the three capacitors indicating the charged state of the capacitors as signals 124. High voltage monitor signals 124 are passed to the RTU 30 of FIG. I for use in its decision making regarding the connection of power factor correction capacitors 10, 11 and 12 to the power line and for monitoring at the central office.

The command buffer 130, shown on the switch driver board 60 in FIG. 2, accepts commands from the controller board 40 from command bus 132. In operation, command buffer 130 accepts three "open switch" and "close switch" commands, one pair of open/close for each of the three switches. These open/close commands control the connection of power factor correction capacitors 10, 11 and 12 to the power line. "Open switch" and "close switch" commands asserted by the controller circuit pack 40 and passed through command buffer 130 are issued to triacs 160, 162, 164, 166, 168 and 170 along signal buses 142, 144 and 146. When a triac is fired by these commands, it discharges one of the firing capacitors 115, 117 or 119 along current paths 150, 152 and 154 respectively into the appropriate solenoid of the associated vacuum-sealed switch box. As mentioned above, the operating current for this operation is supplied by DC power supply 110 and firing capacitors 115, 117, 119. After firing the triac, the DC power supply 110 and charging circuitry 120 then recharge the firing capacitor in about 30 seconds.

Six triacs 160, 162, 164, 166, 168 and 170 are included on the switch driver board 60 and control the issuance of open and close signals to each of the six solenoids within the three switch boxes 3, 4 and 5 of FIG. 1. Each triac functions as a silicon controller rectifier (SCR) in which the presentation of a threshold current at the input pair of terminals, typically 20–30 milliamps, enables a connection at the output pair of terminals which sources a significant current, typically on the order of 40 amps. In this regard, for example, triac 160 controls the solenoid 18 responsible for opening switch 15 in switch box 3 of FIG. 1. In particular, an "open switch" command on command bus 132 passes through command buffer 130 and is presented on signal bus 142. The "open switch" command then causes the activation of a photocell 148 within the triac and consequently activates the triac output. Upon activation, the triac connects firing capacitor 115 via current path 150 to control signal 22 thereby providing an "open switch" trigger signal by providing the necessary energization current for solenoid 18. In order to connect power factor correction capacitor 10 to phase A of the power line, for example, a "close switch" command is issued from controller board 40 on command bus 132 and through command buffer 130 for activation of the photoisolator within triac 162. Activation of the input to triac 162 causes firing capacitor 115, after an appropriate delay time as described below, to be connected to control signal 24 and a "close switch" trigger signal is presented to energize solenoid 20 and cause the closure of switch 15.

An additional recovery signal 134 is asserted upon receipt of an "open switch" or "close switch" command, to activate a recovery time delay module 136. Recovery delay module 136 in turn issues an inhibiting signal 138 which is operatively associated with enable signal 122 such that a subsequent firing of any of the triacs are inhibited for several seconds. The recovery delay module 136 is required for proper operation of triacs 160, 162, 164, 166, 168 and 170 because the triacs will remain on as long as a threshold current remains to be discharged through the output of the triac into the attached solenoid. According to a preferred embodiment of the present invention, a typical firing capacitor discharge time is in the order of one hundred milliseconds. Consequently, a three second delay is programmed into recovery delay module 136 to ensure that firing capacitors 115, 117 and 119 are fully discharged and that triacs 160, 162, 164, 168 and 170 are able to be turned off. The recovery delay module may employ a 555 oscillator circuit to accomplish the time delay.

Figure 3:
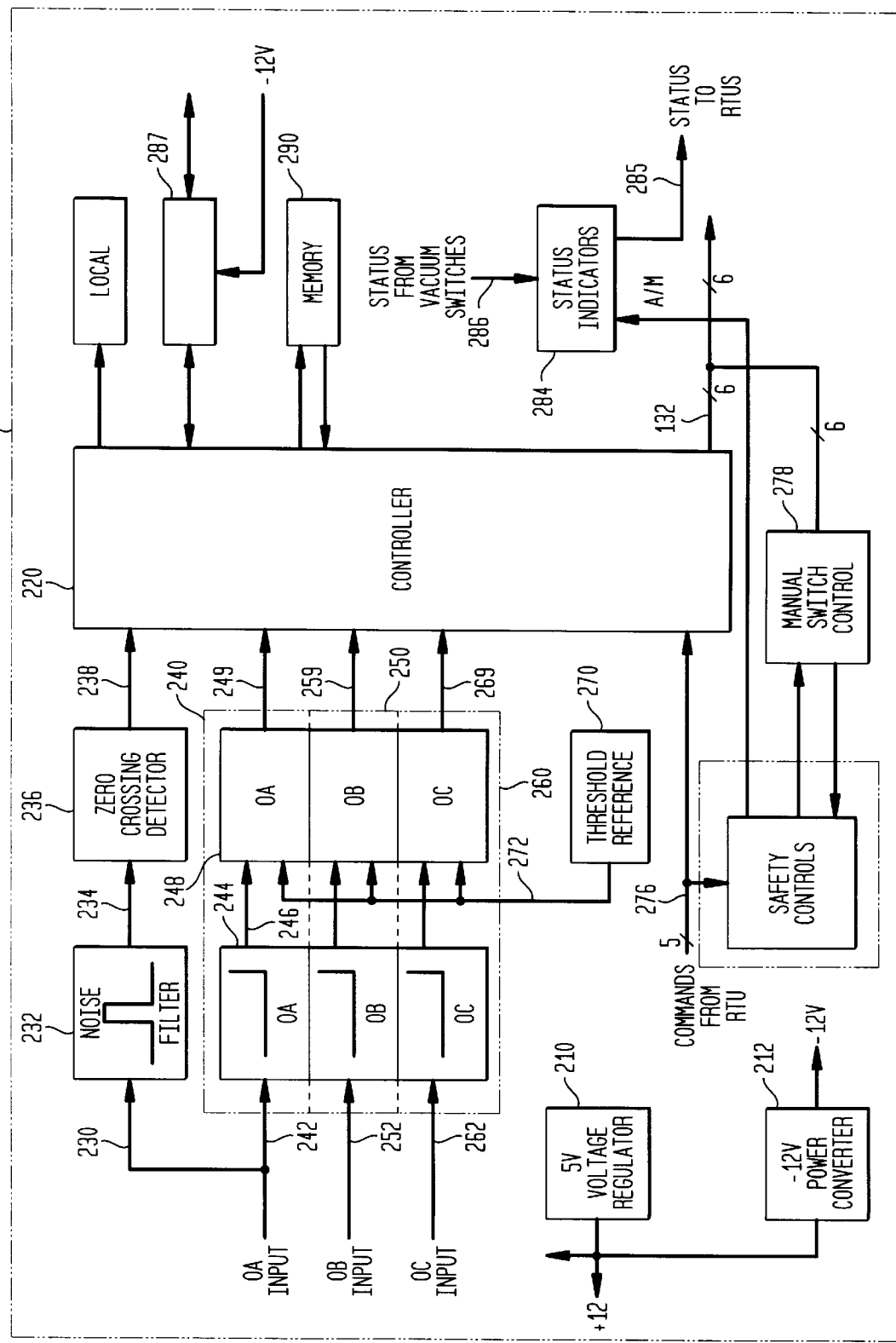
FIG. 3 is a block diagram of another component circuit of the system shown in FIG. 1.

A general block diagram of controller board 40 is shown in FIG. 3. Voltage regulators 210 and 212 convert the +12 V to both −12 V and +5 V for use on the controller circuit pack. Controller 220 is at the heart of the controller circuit pack and provides the intelligence necessary to operate the present invention. Controller 220 may be a microprocessor, a microcontroller, an application specific integrated circuit (ASIC), or other suitable controller that provides the functionality of the apparatus and methods described herein. In a preferred embodiment, controller 220 is a PIC16C65A microprocessor. Controller 220 accepts numerous command and data inputs and provides numerous command outputs to provide for the control and operation of the controller board 40 and switch driver board 60.

All three-phase voltage levels provided by RTU 30 are input to controller board 40 via bus signals 242, 252 and 262. One phase of the three phase power line is fed to a noise filter 232 via signal path 230. Noise filter 232 filters noise from the 60 Hz power line and feeds noise filtered signal 234 to a zero crossing detector 236. Zero crossing detector detects the point at which the input line voltage crosses through the zero voltage point. The zero crossing trigger signal 238 detected by zero crossing detector 236 is then fed to controller 220. Noise filter 232 may consist of any suitable low-pass filter of appropriate construction, including RC networks, operational amplifier designs, or digital signal processing filters. Noise filter 232 typically has a center frequency of 60 Hz. Likewise, the zero crossing detector may be constructed of suitable analog or digital components which achieve the function of providing a trigger signal indicating the crossing of the line voltage through the 0 V point.

Three sets of voltage disturbance detectors, 240, 250 and 260 are also provided as inputs to controller 220. These voltage disturbance detectors all operate in a similar fashion and their common operation is discussed with respect to voltage disturbance detector 240.

Voltage disturbance detector 240 accepts one phase 242 of the three phase power line indicated as ΦA and passes that signal through high-pass filter 244. High-pass filter 244 then outputs the filtered signal 246, which indicates any disturbance on that line phase, to comparator 248. Comparator 248 accepts a threshold reference signal 272 from a threshold reference generator 270 and compares filtered signal 246 to determine if it is above the threshold reference. If comparator 248 determines that the filtered signal exceeds the threshold reference signal, an interrupt for that phase is generated as signal 249 and input to controller 220. The operation of voltage disturbance detectors 250 and 260 operate in a similar fashion. As with the circuitry comprising low-pass filter 232 and threshold detector 236, voltage disturbance detectors 240, 250 and 260 may be composed of any suitable or appropriate analog or digital circuitry to provide the above-mentioned functions. In a preferred embodiment, high-pass filter is constructed from an LM 324 operational amplifier with a 2 kHz cutoff. The LM 324 feeds a HI-LO comparator consisting of a pair of LM 339s that use an empirically determined reference voltage as described below.

Threshold reference generator 270 determines the output disturbance threshold at which controller 220 will determine that an adjustment to the switching time of the capacitors needs to be made to minimize the power line disturbances resulting from the switching of the power factor correction capacitors. As such, threshold reference generator 270 may comprise a voltage divider network for producing appropriate reference thresholds from the +12 volt and -12 volt onboard power supplies, for example. This voltage divider network may include a potentiometer for user selectability and tuning to enable the reference threshold to be manually adjusted and determine the level at which comparator 248 interrupts controller 200. According to one preferred embodiment of the present invention, the three phase voltages, as passed to controller board 40 on signals 242, 252 and 262, are 6 V transformed versions of the full 120 V phase voltages. Given this, it has been empirically determined that a post-filtered threshold voltage of between 1.6 V and 1.7 V, i.e. after the high-pass filtering of these signals at 246, provides a good interrupt threshold. As such, a disturbance on any phase of the three phase power line which provides a filtered signal that exceeds this threshold voltage will be interpreted by the controller as due to the switching of power factor correction capacitors 10, 11 and 12. When this occurs, controller 220 will record the time of these disturbances with respect to the received zero crossing trigger signals 238 and will adjust the anticipated switch times for the capacitor on the phase according to the time of the detected disturbance. In general, the larger the time differential between the detection of a voltage disturbance and the detection of the zero crossing threshold, the larger the correction that needs to be made to the anticipated switch time.

Nonvolatile memory 290 is provided to store the anticipated switch times calculated by controller 220. According to a preferred embodiment of the present invention, six distinct measurements are made as part of an initialization procedure, one each for the opening and closing of the switch solenoids within switch boxes 3, 4 and 5. These switch times are determined by the controller as a delay between the issuance of the "open/close switch" command to the switch driver board on command bus 132 and the detected voltage disturbance on the respective line phases as input to controller 200 on phase interrupt inputs 249, 259 and 269. These delay times, among other calculated values derived therefrom, are stored in nonvolatile memory 290 for later use. Controller 200 uses these stored delay times to calculate an anticipation time at which "open/close switch" commands issued on command bus 132 will result in the triggering of the switches a delay time in advance of a zero voltage or zero current crossing. With respect to the connection of the capacitor to the power line, the controller will calculate the delay from the issuance of the "close switch" command so as to cause the capacitor to switch onto the voltage line at or very close to a zero crossing of that phase. As the switches within switch boxes 3, 4 and 5 become more used, their measured switching time changes relative to the triggering signals for energizing the solenoids. New anticipation switch times are determined by controller 220 and stored in nonvolatile memory 290 when such changes in switching time occur.

Commands from RTU 30 of FIG. 1 are input to controller 220 along signal bus 276. In this fashion, specific commands, such as the opening and closing of the switch to connect or disconnect the capacitor at a particular time of the day or specific commands for opening and closing the switch from a central control office, may be passed from the RTU and through the controller board 40. Through this command passing, the zero crossing efficiencies in the switching operations of controller board 40 and switch driver board 60 are used.

Manual switch control 278 may be optionally included to enable field personnel to manually switch the capacitors in or out. Manual switch control 278 effectively bypasses the zero voltage crossing control provided by controller board 40 and switch driver board 60. Safety controls, such as latches and relays, are provided in block 277 to ensure that any attempted manual switching of the capacitors does not occur contemporaneously with automated or central office switching of the capacitors.

Element 284 may also be included to provide various operating indicators, such as status LED's and buzzers indicating emergency conditions. In a preferred embodiment of the present invention, optical indicators showing the open/closed status of the solenoid switches, visual indicators showing the charge status of the firing capacitors 115, 117 and 119, and visual indicators indicating proper line voltages for each of the power line's three phases may be provided. Switch box status may also be routed through controller board 40 and provided to the RTU 30 via status signal buses 286 and 285 respectively.

In a further embodiment of the present invention, a serial communication interface 287 may be provided for field service personnel to directly access controller 220 and provide diagnostic field support for both the controller and switch driver boards.

FIG. 4 shows a sample voltage characteristic of a single phase of the three phase power distribution line. In particular, FIG. 4 shows phase A voltage characteristic 410 as a sinusoidal signal having a frequency of 60 Hz and a period (Tp) of 16.66 milliseconds. Sinusoidal waveform 410 of phase A will have a root-mean-squared voltage of approximately 120 volts and therefore, a peak voltage of about 169 volts, as indicated in FIG. 4. As previously mentioned, the variable switch delay timings are initialized when controller 220 of FIG. 3 issues a series of "close switch" and "open switch" commands on command bus 132. By detecting the delay between the issuance of the commands and the appearance of a voltage disturbance in the voltage disturbance detectors 240, 250 and 260, the controller can determine an anticipation time for each of the six open/close functions.

When closing the vacuum switches, it is desirable to cause the switch to close, and the power factor correction capacitor to be connected to the power line, at a zero voltage crossing since connection of a capacitor having a 0 V residual voltage at the zero crossing will introduce no voltage transients on the power line. A capacitor discharge mechanism may be included as part of the overall system to ensure that the power factor correction capacitors are discharged prior to connection to the power line. During the above-mentioned initialization procedure, for example, the controller may receive a zero-crossing trigger on signal 238 from zero crossing detector 236 at time T2 and immediately initiate a "close switch" command on the command bus 132. The controller will then detect an output voltage disturbance after a switch delay time, shown as 420, which is detected by disturbance detector 240 and fed to controller 220 at time T3. Realizing that the next "close switch" command on the same phase must precede the zero crossing by the switch delay amount 420, equal to the time period shown as 430, a post zero crossing anticipation time 432 can be determined by the controller by subtracting switch delay time 430 from a half period of the sinusoid (T2). This phase A "close switch" anticipation time is then stored in nonvolatile memory 290 by controller 220. When a subsequent "close switch" command is issued by the RTU or the central office to connect power factor correction capacitor 10 to phase A of the power line, controller 220 first detects the zero crossing on signal 238 from zero crossing detector 236 at time T0 and waits for the previously stored anticipation time of 432. At T1, after the anticipation time 432, the controller issue the "close switch" command, triac 160 is activated, and switch 15 closes and connects power factor correction capacitor 10 to phase A of the power line after switch delay time 430 has elapsed, thereby connecting capacitor 10 at or very near the zero crossing point 405 at time T2.

The delay in closing switch 15 after the initiation of the "close switch" command on command bus 132 is actually composed of two parts. The first delay portion, called a wait time, will be the delay through the circuitry of the controller board 40 and a switch driver board 60 in processing the "close switch" command. This delay will consist primarily of the delays within the controller 220, propagation delays along command bus 132 to command buffer 130, signal delays along signal paths 142, 144 and 146, and delays in firing triacs 160, 164 and 168. The second portion of the delay begins after the firing of the triacs and consists of the delay time in energizing the solenoids within switch boxes 3, 4, and 5 by firing capacitors 115, 117 and 119 respectively. This energization delay for the solenoids lasts until the point that the vacuum switch 15 closes, resulting in the attachment of power factor correction capacitors 10, 11 and 12 to the three phase voltage line. As mentioned above, this energization delay is significantly greater than the circuit and propagation delays involved in the wait time, and is often on the order of 10 milliseconds or more.

The schematic representation of the timing in FIG. 4 is overly simplified since the typical delay times for the vacuum switches can be on the order of 10 milliseconds or more. As such, the switch delay times will often exceed a half period or more of the phase voltage cycle. In this case, the anticipation times are calculated by the controller 220 by simply subtracting the largest possible, integral number of half periods from the switch delay times prior to calculating the anticipation time. Using this calculated anticipation time, typically less than a half period, will result in a total delay equal to the anticipation time plus the switch delay of greater than a half period. Persons of skill in the art will recognize numerous methods by which to achieve this result.

Unlike the switch closing, it is desirable to cause the switch to open, and the power factor correction capacitor to be disconnected from the power line, when the current through the capacitor is zero. Since the capacitor current is out of phase with the line voltage by 90 degrees, the current through the capacitor falls to zero when the line voltage is at its maximums and minimums.

The initialization procedure for recording switch delays related to the "open switch" command is identical to that for the "close switch" command in that, for example, the controller may receive a zero-crossing trigger on signal 238 from zero crossing detector 236 at time T2 and immediately initiate an "open switch" command on the command bus 132. The controller will then detect an output voltage disturbance after a switch delay time, shown as 420, which is detected by disturbance detector 240 and fed to controller 220 at time T3. Realizing that the next "open switch" command must precede the zero crossing by the switch delay 420 plus a half a cycle, the controller 220 determines a post zero crossing anticipation time 432 by subtracting switch delay time 420, equal to time 430, from a half period of the sinusoid (T2). One half a cycle period is then added to the result to obtain the phase A "open switch" anticipation time, which is stored in nonvolatile memory 290 by controller 220. When a subsequent "open switch" command is issued by the RTU or the central office to disconnect power factor correction capacitor 10 from phase A of the power line, controller 220 first detects the zero crossing on signal 238 from zero crossing detector 236 at time T0 and waits for the previously stored anticipation time of 432. At T1, after the anticipation time 432, the controller issues the "open switch" command, triac 160 is activated, and switch 15 opens and disconnects power factor correction capacitor 10 from phase A of the power line after a time 430 plus one half a cycle has elapsed. This effectively disconnects capacitor 10 at or very near the voltage maximum point 407 at time T5.

The same comments involving the multiple delay components and the length of the switch delays apply equally as well to the "open switch" commands as they do to the "close switch" commands.

In a three phase power system, phases B and C will be 60 degrees and 120 degrees respectively out of phase with power line phase A. This results in the zero voltage crossing points for phases B and C being offset by 5.55 milliseconds and 11.11 milliseconds respectively from those detected on phase A by zero crossing detector 236. As; such, the controller 220 determines the open/close anticipation switch times exactly as described above, i.e. with respect to the zero crossings of phase A, and offsets these by 5.55 milliseconds and 11.11 milliseconds for phases B and C respectively to correct for the phase differences. Persons of skill in the art will recognize that other calculation methods taking the above-mentioned phase differences into account may be employed to achieve the same result.

As the switch becomes used, the delay in the solenoids may change thereby introducing error into the use of the above-calculated anticipation switching times. As shown in FIG. 4, for example, the "close switch" command may cause the capacitor to be attached to the power line at T4 instead of T2, thereby producing a small voltage spike 406 when the power factor correction capacitor is connected. The presence of this voltage disturbance, and more importantly the time of its occurrence, will be detected by voltage disturbance detector 240 and fed to controller 220. Based on the detected time difference between received zero voltage crossing 405 at signal 238 and the time at which voltage disturbance 406 is measured on line 249 to controller 220, the previously stored anticipation time 430 may be adjusted by an amount 450 equal to the same difference. In effect, anticipation time 432 would now move, as shown in FIG. 4, from T1 to T1 prime so that the additional switch delay is provided for in estimating the zero crossing. In this manner, the present invention stores and uses the most currently determined anticipation times based on the latest empirically determined switch delays. Finally, adjustments to the switch anticipation time can also be limited by a tolerance value stored within controller 200 so that anticipation time corrections based on erroneously determined anticipation times can be omitted, thereby preserving the current anticipation values.

Persons of skill in the art will recognize that the above calculations may be performed in a number of different ways to achieve appropriate anticipation times which minimize the voltage disturbances on the power line without departing from the nature of the present invention.

The Appendix shows one example of a pseudo code routine for execution by controller 220 in determining the anticipation times for switching the power factor correction capacitors in and out of the power line.

While particular embodiments and applications of the invention have been shown and described, it will be obvious to those skilled in the art that the specific terms and figures are employed in a generic and descriptive sense only and not for the purposes of limiting or reducing the scope of the broader inventive aspects herein. By disclosing the preferred embodiments of the present invention above, it is not intended to limit or reduce the scope of coverage for the general applicability of the present invention. Persons of skill in the art will easily recognize the substitution of similar components and steps in the apparatus and methods of the present invention.

APPENDIX initialization..
    command-count = 0
    wait refractory time period

-continued

APPENDIX goto main-loop
main-loop:
    wait for command
loop1:
    increment command-count
    store command code in command matrix
    fetch appropriate act-time from memory, put in matrix
    if command-count == 3, goto action
    start 2 second timer
    if additional command, loop1
    else
action:
    activate zero-crossing detector
    when interrupt occurs:
    start up-counter TURN OFF THE OUTPUT
    activate appropriate glitch detectors.
    start 1-sec timer
    next act-time = first act-time
loop2:
    compare up-count to next act. time
    if (count < act-time) go loop2,
    else
        do control action
        decrement command-count
        if command_count == 0 goto nocmd
        else next act-time = $2^{nd}$ or $3^{rd}$ actime
        goto loop2
nocmd:
    if 1-sec timer > 0, goto nocmd
    else
        turn off glitch detectors
        turn off up-count
        goto main-loop
        check for a glitch-detected flag
        if flag is present, call re-calc
end:main-loop
glitch interrupt service routine:
read the up-counter
determine which glitch detector fired. Place count in matrix
set glitch-detected stat in matrix
increment glitch count
end: glitch interrupt service
re-calc:
    for phase == 0, phase < 3
        if glitch present in matrix, determine if early or late
        calculate new value of act-time. Put new value in
            matrix, replacing old value
    next phase
    if glitch count ! = 0 write new values to serial E2
    glitch count = 0;
matrix has:
    state (1);
    ontime 2
    offtime 2
    glitchtime 2
    glitchflag 1
    onmask 1
    offmask 1
    total: 10 bytes/phase = 30 bytes total
on w.d. or power up, the matrix states (3), and the 3 glitch flags
are initialized to zero..
When a trip or close command arrives for a particular phase,
the state of the phase is set to one, and the trip or close data,
including the on time, off time, on mask and off mask are retrieved
from the flash memory.

What is claimed is:

1. A system for minimizing transients in an electric power distribution system comprising:

an electrical bus for distributing electric power, said electrical bus including at least a single phase ac voltage;

a capacitor operatively associated with said electrical bus for varying a capacitance on said electrical bus to perform power factor correction;

a mechanical switch for electrically connecting and disconnecting said capacitor to said electrical bus, said mechanical switch including a variable switch delay defined by a time delay between a switch trigger and said connecting and disconnecting of said capacitor to said electrical bus;

a disturbance detector for measuring a voltage disturbance on said single phase ac voltage of said electrical bus when said capacitor is connected to and disconnected from said phase by said mechanical switch, and a switch controller for determining said variable switch delay based on said voltage disturbance whereby said controller issues said switch trigger at such a time to minimize said voltage disturbance when said mechanical switch electrically connects and disconnects said capacitor to said electrical bus.

2. The system for minimizing transients in an electric power distribution system of claim 1 wherein said single phase ac voltage has zero crossings, said system further comprising: a zero crossing detector for detecting said zero crossings, said switch controller further determining a connection anticipation time measured from said zero crossings, the sum of said connection anticipation time and said variable switch delay equaling a time between zero crossings, said switch controller minimizing said voltage disturbance by issuing said switch trigger at said connection anticipation time whereby said mechanical switch electrically connects said capacitor to said electrical bus at said zero crossings.

3. The system for minimizing transients in an electric power distribution system of claim 2 further comprising a capacitor discharger for discharging said capacitor to zero volts prior to connection to said electrical bus.

4. The system for minimizing transients in an electric power distribution system of claim 1 wherein said single phase ac voltage has zero crossings, said system further comprising a zero crossing detector for detecting said zero crossings, said switch controller further determining a disconnection anticipation time measured from said zero crossings, the sum of said disconnection anticipation time and said variable switch delay equaling a time between zero crossings plus a half of the time between two consecutive zero crossings, said switch controller minimizing said voltage disturbance by issuing said switch trigger at said disconnection anticipation time whereby said mechanical switch electrically disconnects said capacitor from said electrical bus at a point half way between said zero crossings.

5. The system for minimizing transients in an electric power distribution system of claim 1 wherein said electrical bus includes a three-phase ac voltage and said system further comprises a plurality of capacitors, at least one of said plurality of capacitors operatively associated to said electrical bus for varying a capacitance of each of said phases of said electrical bus.

6. The system for minimizing transients in an electric power distribution system of claim 1 wherein said time delay between said switch trigger and said connecting of said capacitor to said electrical bus is different from said time delay between said switch trigger and said disconnecting of said capacitor from said electrical bus.

7. The system for minimizing transients in an electric power distribution system of claim 1 further comprising a memory for storing said variable switch delay, said switch controller modifying said stored variable switch delay based on said voltage disturbance when said capacitor is connected to and disconnected from said electrical bus.

8. The system for minimizing transients in an electric power distribution system of claim 7 further comprising a comparator for comparing said voltage disturbance to a voltage disturbance threshold, said switch controller modifying said stored variable switch delay when said comparator determines that said voltage disturbance exceeds said voltage disturbance threshold.

9. The system for minimizing transients in an electric power distribution system of claim 7 further comprising a tolerance representing a maximum modification to said stored variable switch delay.

10. The system for minimizing transients in an electric power distribution system of claim 1 wherein said switch controller further determines a wait time representative of a circuit delay from said voltage disturbance and issues said switch trigger based on both said variable switch delay and said wait time so as to minimize said voltage disturbance.

11. The system for minimizing transients in an electric power distribution system of claim 1 wherein said disturbance detector is a high-pass filter.

12. The system for minimizing transients in an electric power distribution system of claim 1 wherein said switch controller is a microprocessor.

13. The system for minimizing transients in an electric power distribution system of claim 1 further comprising a noise filter for filtering noise on said electrical bus.

14. The system for minimizing transients in an electric power distribution system of claim 1 further comprising a remote terminal unit operatively coupled to said switch controller for making decisions regarding said connections and disconnections of said capacitor to and from said electrical bus.

15. The system for minimizing transients in an electric power distribution system of claim 1 further comprising a manual override for overriding the issue of said switch trigger by said switch controller.

16. The system for minimizing transients in an electric power distribution system of claim 1 wherein said mechanical switch is a vacuum-sealed switch having a solenoid for operating said switch.

17. The system for minimizing transients in an electric power distribution system of claim 16 further comprising a triac for firing an energizing capacitor into said solenoid according to a switch controller command, said firing of said triac comprising said switch trigger.

18. The system for minimizing transients in an electric power distribution system of claim 17 further comprising a delay module for enforcing a delay between subsequent firings of said triac.

19. A method for minimizing transients in the power factor correction of an electric power distribution system, said method comprising:

determining a variable switch delay for a mechanical switch, said variable switch delay defined by a time delay between a switch trigger and a connecting or disconnecting of a capacitor to an electrical bus, said electrical bus having at least a single phase ac voltage;

determining a connection or disconnection time for said capacitor to said electrical bus;

triggering said mechanical switch at said variable switch delay prior to said determined connection or disconnection time;

measuring a voltage disturbance on said electrical bus resulting from said capacitor connection or disconnection to said electrical bus, and adjusting said triggering of said switch based on said voltage disturbance.

20. The method for minimizing transients in the power factor correction of claim 19 wherein said step of determining said connection or disconnection time includes:

detecting zero crossings of said ac voltage, and determining a connection anticipation time measured from said zero crossing, the sum of said connection anticipation time and said variable switch delay equaling a time between said zero crossings, and said step of triggering being performed such that said capacitor is connected to said electrical bus at said zero crossings.

21. The method for minimizing transients in the power factor correction of claim 19 wherein said step of determining said connection or disconnection time includes:

detecting zero crossings of said ac voltage, and determining a disconnection anticipation time measured from said zero crossing, the sum of said disconnection anticipation time and said variable switch delay equaling a time between said zero crossings plus a half of the time between two consecutive zero crossings, and said step of triggering being performed such that said capacitor is disconnected from said electrical bus at a point half way between said zero crossings.

22. The method for minimizing transients in the power factor correction of claim 19 further comprising storing said variable switch delay time in a memory.

23. The method for minimizing transients in the power factor correction of claim 22 wherein step of storing includes the steps of storing both a connection time and a disconnection time.

24. The method for minimizing transients in the power factor correction of claim 19 further comprising comparing said voltage disturbance to a voltage disturbance threshold and performing said step of adjusting said triggering when said voltage disturbance threshold is exceeded.

25. The method for minimizing transients in the power factor correction of claim 19 further comprising determining a wait time based on circuit delays, said step of adjusting being based on said wait time.

26. The method for minimizing transients in the power factor correction of claim 19 further comprising filtering noise from said electrical bus.

27. The method for minimizing transients in the power factor correction of claim 19 wherein said step of measuring includes high-pass filtering.

28. A system for minimizing transients in an electric power transmission line comprising:

a mechanical switch for electrically connecting and disconnecting an electrical component to said transmission line, said mechanical switch including a variable switch delay defined by a time delay between a switch trigger and said connecting and disconnecting of said electrical component to said transmission line;

a disturbance detector for measuring a voltage disturbance on said transmission line when said electrical component is connected to and disconnected from said transmission line by said mechanical switch, and a switch controller for determining said variable switch delay based on said voltage disturbance whereby said switch controller issues said switch trigger at such a time to minimize said voltage disturbance when said mechanical switch electrically connects and disconnects said electrical component to said transmission line.

29. The system for providing transient free power factor correction of claim 28 wherein said electrical component is a capacitor used to correct said power factor.

30. The system for providing transient free power factor correction of claim 29 further comprising a capacitor discharger for discharging said capacitor to zero volts prior to connection to said transmission line.

31. The system for providing transient free power factor correction of claim 28 wherein said transmission line includes zero voltage crossings, said system further comprising: a zero voltage crossing detector for detecting said zero voltage crossings, said switch controller further determining a connection anticipation time measured from said zero voltage crossings, the sum of said connection anticipation time and said variable switch delay equaling a time between zero voltage crossings, said switch controller minimizing said voltage disturbance by issuing said switch trigger at said connection anticipation time whereby said mechanical switch electrically connects said electrical component to said transmission line at said zero voltage crossings.

32. The system for providing transient free power factor correction of claim 28 wherein said transmission line includes zero voltage crossings, said system further comprising a zero voltage crossing detector for detecting said zero voltage crossings, said switch controller further determining a disconnection anticipation time measured from said zero voltage crossings, the sum of said disconnection anticipation time and said variable switch delay equaling a time between zero voltage crossings plus a half of the time between two consecutive zero voltage crossings, said switch controller minimizing said voltage disturbance by issuing said switch trigger at said disconnection anticipation time whereby said mechanical switch electrically disconnects said electric component from said electrical bus at a point half way between said zero voltage crossings.

* * * * *